United States Patent
Denomme et al.

(10) Patent No.: US 12,157,117 B2
(45) Date of Patent: Dec. 3, 2024

(54) PIPETTE DISPENSER SYSTEM AND METHOD

(71) Applicant: Nicoya Lifesciences Inc., Kitchener (CA)

(72) Inventors: Ryan Cameron Denomme, Kitchener (CA); Krishna Iyer, Waterloo (CA); Patrick Sterlina, Apex, NC (US); Gordon H. Hall, Cambridge (CA); Arjun Sudarsan, Carlsbad, CA (US)

(73) Assignee: Nicoya Lifesciences Inc., Kitchener (CA)

( * ) Notice: Subject to any disclaimer, the term of this patent is extended or adjusted under 35 U.S.C. 154(b) by 0 days.

(21) Appl. No.: 18/044,276

(22) PCT Filed: Sep. 7, 2021

(86) PCT No.: PCT/CA2021/051231
§ 371 (c)(1),
(2) Date: Mar. 7, 2023

(87) PCT Pub. No.: WO2022/051840
PCT Pub. Date: Mar. 17, 2022

(65) Prior Publication Data
US 2023/0330656 A1    Oct. 19, 2023

Related U.S. Application Data

(60) Provisional application No. 63/075,541, filed on Sep. 8, 2020, provisional application No. 63/139,173, filed on (Continued)

(51) Int. Cl.
*B01L 3/02* (2006.01)
*G01N 35/10* (2006.01)
*G06V 20/52* (2022.01)

(52) U.S. Cl.
CPC .............. *B01L 3/021* (2013.01); *G06V 20/52* (2022.01)

(58) Field of Classification Search
None
See application file for complete search history.

(56) References Cited

U.S. PATENT DOCUMENTS 8,349,276 B2 * 1/2013 Pamula ............ B01L 3/502792
204/600
9,322,823 B2   4/2016 Denomme et al.
(Continued)

FOREIGN PATENT DOCUMENTS

CA    2396243 A1    7/2001
CA    2846909 A1    9/2014
(Continued)

OTHER PUBLICATIONS

Gilson, Trackman Connected. available at https://www.gilson.com/default/trackman-connected.html.
(Continued)

*Primary Examiner* — Matthew D Krcha
*Assistant Examiner* — Brittany I Fisher

(57) ABSTRACT

A pipette dispenser vision system and method are disclosed. For example, a pipette dispenser vision system is provided for tracking pipettes with respect to dispensing liquid into target fluid wells, vessels, and/or reservoirs. The presently disclosed pipette dispenser vision system may include, for example, a computing device, a red/green/blue (RGB) imaging device, an infrared (IR) imaging device, an IR illumination source, and an IR sensor; all arranged with respect to, for example, a single-channel and/or a multi-channel pipette for dispensing liquid into a dispensing platform. Further, a method of using the presently disclosed pipette dispenser vision system is provided. For example, the method processes image data from the RGB imaging device and/or the
(Continued)

IR imaging device to monitor/verify certain operations of the pipetting process and/or dispensing platform.

18 Claims, 13 Drawing Sheets

Related U.S. Application Data on Jan. 19, 2021, provisional application No. 63/233,607, filed on Aug. 16, 2021.

(56) References Cited

U.S. PATENT DOCUMENTS

| | | | |
|---|---|---|---|
| 10,794,904 B2 | 10/2020 | Denomme et al. | |
| 11,278,890 B2 | 3/2022 | Denomme et al. | |
| 11,598,771 B2 | 3/2023 | Denomme et al. | |
| D983,682 S | 4/2023 | Lubjenka et al. | |
| 2007/0177778 A1 | 8/2007 | Massaro | |
| 2010/0039513 A1* | 2/2010 | Glickman | G06V 20/52 |
| | | | 382/165 |
| 2012/0242825 A1* | 9/2012 | Quan | G01N 33/00 |
| | | | 348/87 |
| 2017/0370956 A1* | 12/2017 | Hurwitz | G06V 20/66 |
| 2018/0259544 A1 | 9/2018 | Machiraju et al. | |
| 2020/0057880 A1* | 2/2020 | Mizutani | G06T 7/0014 |
| 2020/0249248 A1 | 8/2020 | Sarich et al. | |

FOREIGN PATENT DOCUMENTS

| | | | |
|---|---|---|---|
| CZ | 306253 B6 | 11/2016 | |
| EP | 2112514 A1 | 10/2009 | |
| EP | 2293029 A1 | 3/2011 | |
| EP | 3660517 A1 | 6/2020 | |
| WO | WO-2020031089 A1 | 2/2020 | |
| WO | WO-2020049524 A1 | 3/2020 | |
| WO | WO-2020061715 A1 | 4/2020 | |
| WO | WO-2020065537 A1 | 4/2020 | |
| WO | WO-2020186360 A1 | 9/2020 | |
| WO | WO-2021097582 A1 | 5/2021 | |
| WO | WO-2021146804 A1 | 7/2021 | |
| WO | WO-2021146809 A1 | 7/2021 | |
| WO | WO-2021168578 A1 | 9/2021 | |
| WO | WO-2021212235 A1 | 10/2021 | |
| WO | WO-2022051840 A1 | 3/2022 | |
| WO | WO-2022082316 A1 | 4/2022 | |
| WO | WO-2022164756 A2 | 8/2022 | |
| WO | WO-2022165589 A1 | 8/2022 | |
| WO | WO-2022187931 A1 | 9/2022 | |
| WO | WO-2022187954 A1 | 9/2022 | |
| WO | WO-2022221946 A1 | 10/2022 | |
| WO | WO-2022221947 A1 | 10/2022 | |
| WO | WO-2022246569 A1 | 12/2022 | |
| WO | WO-2023004516 A1 | 2/2023 | |
| WO | WO-2023039678 A1 | 3/2023 | |

OTHER PUBLICATIONS

De Jouvencel et al., Enabling verifiable science through smart, connected lab devices. American Laboratory. 50(5):26-27 (2018).
Gilson, Trackman Connected. available at https://www.gilson.com/default/trackman-connected.html. Year: 2018.
PCT/CA2021/051231 International Preliminary Report on Patentability (Chapter I) dated Mar. 7, 2023.
PCT/CA2021/051231 International Search Report and Written Opinion dated Nov. 9, 2021.
Waters, Pipetting robot using electronic pipettes for liquid handling—Andrew+ (2022). Available at https://www.andrewalliance.com/pipetting-robot/.
Extended European Search Report issued in corresponding European Application No. 21865416.8, mailed Jul. 10, 2024. 9 pages.

\* cited by examiner

Imaging devices 158

Illumination sources 160

Sensing devices 162

PIPETTE DISPENSER SYSTEM AND METHOD

1. CROSS REFERENCE TO RELATED APPLICATION

The present application is a 371 application of International Application No. PCT/CA2021/051231, filed Sep. 7, 2021, which claims the benefit of priority to U.S. Patent Application No. 63/075,541, filed Sep. 8, 2020, 63/139,173, filed Jan. 19, 2021, and 63/233,607, filed Aug. 16, 2021, which are specifically incorporated by reference herein for all that they disclose or teach.

2. FIELD OF THE INVENTION

The subject matter of the invention relates generally to liquid dispensing methods and more particularly to a pipette dispenser system and method.

3. BACKGROUND OF THE INVENTION

Manual and/or automated liquid handling instruments may be used, for example, to transfer specific quantities of liquids, such as reagents or samples, between designated containers. Liquid handling instruments are useful in a variety of applications including cell biology, genomics, forensics, and drug research. The instruments assist humans with the repetitive task of transferring liquids in a wide range of volumes to improve speed and efficiency of the operations, as well as precision and accuracy of the delivered volumes. The advantages of automating liquid handling processes include increasing throughput and efficiency of operations and eliminating human errors. However, certain drawbacks of manual and/or automated liquid handling processes may include underfilling or over filling certain containers, missing to load containers, and loading containers with the incorrect fluid. Further, the probability of errors increases when a container plate or cassette contains multiple wells. Therefore, new approaches are needed with respect to real-time feedback to guide the container loading process, estimating the volume dispensed, and providing feedback for error correction or disposition.

4. SUMMARY OF THE INVENTION

The invention provides a pipette dispenser vision system. In some embodiments, the pipette dispenser vision system may include: (a) a dispensing platform comprising a plurality of wells; (b) one or more pipettes arranged for conducting a pipetting process comprising dispensing liquid to the plurality of wells of the dispensing platform; (c) an imaging device arranged for imaging the dispensing platform during the pipetting process to generate image data; and (d) one or more controllers electronically coupled to the one or more pipettes and to the imaging device and configured to receive the image data, and based on the image data, verify the pipetting process.

The one or more controllers may be further configured to, based on the image data, cause one or more pipettes to modify the pipetting process.

The one or more pipettes may be robotically controlled.

The pipette dispenser system may further include a second imaging device arranged for imaging the dispensing platform during the pipetting process to generate second image data.

The imaging device may be an RGB imaging device, and the second imaging device may be an IR imaging device.

The pipette dispenser vision system may include a user interface electronically coupled to the one or more controllers and configured to indicate a fill status of one or more wells of the dispensing platform.

The plurality of wells may include dispense indicators. The dispense indicators may be an oil film.

The invention provides a method of using a pipette dispenser vision system. The method may include conducting a pipetting process that includes dispensing liquid to a plurality of wells of a dispensing platform. The method may include imaging the dispensing platform during the pipetting process to generate image data and based on the image data, verifying the pipetting process.

In some cases, the method further includes modifying the pipette process.

The invention provides a method of using a pipette dispenser vision system. The method may include conducting a pipetting process that includes dispensing liquid to a plurality of wells of a dispensing platform. The method may include imaging the dispensing platform during the pipetting process to generate image data and based on the image data, removing liquid from at least one well of the dispensing platform. The method may include detecting a pipette entering the well from which to remove liquid. The method may include observing the pipette aspirating liquid. The method may include determining whether there are aqueous droplets in the oil and based on the determining, confirming that the liquid is removed from the well.

5. BRIEF DESCRIPTION OF DRAWINGS

Figure 1:
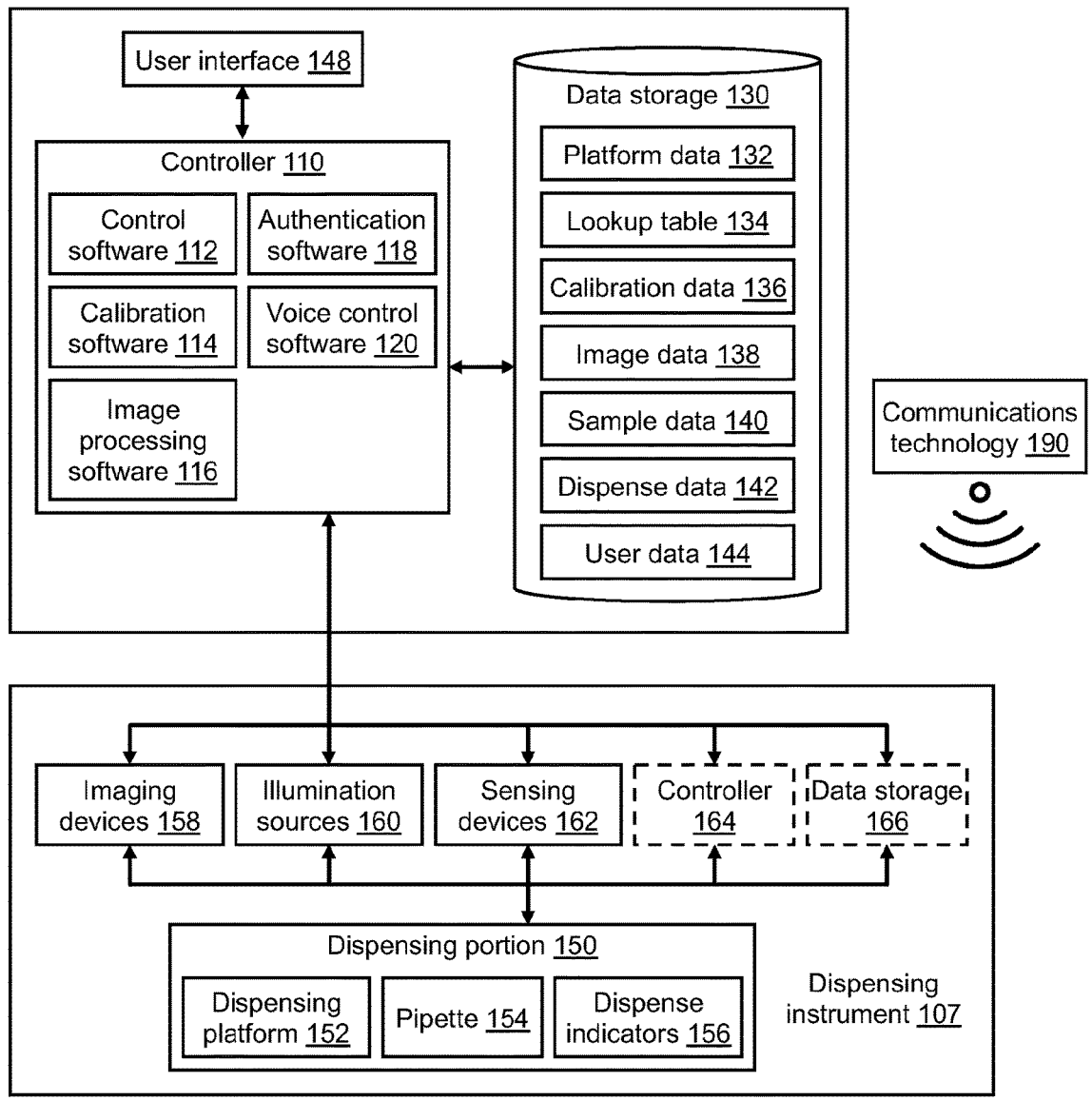
FIG. 1 illustrates a block diagram of an example of the presently disclosed pipette dispenser vision system for tracking pipettes with respect to dispensing liquid into target fluid wells, vessels, and/or reservoirs in accordance with some embodiments.
Figure 7A:
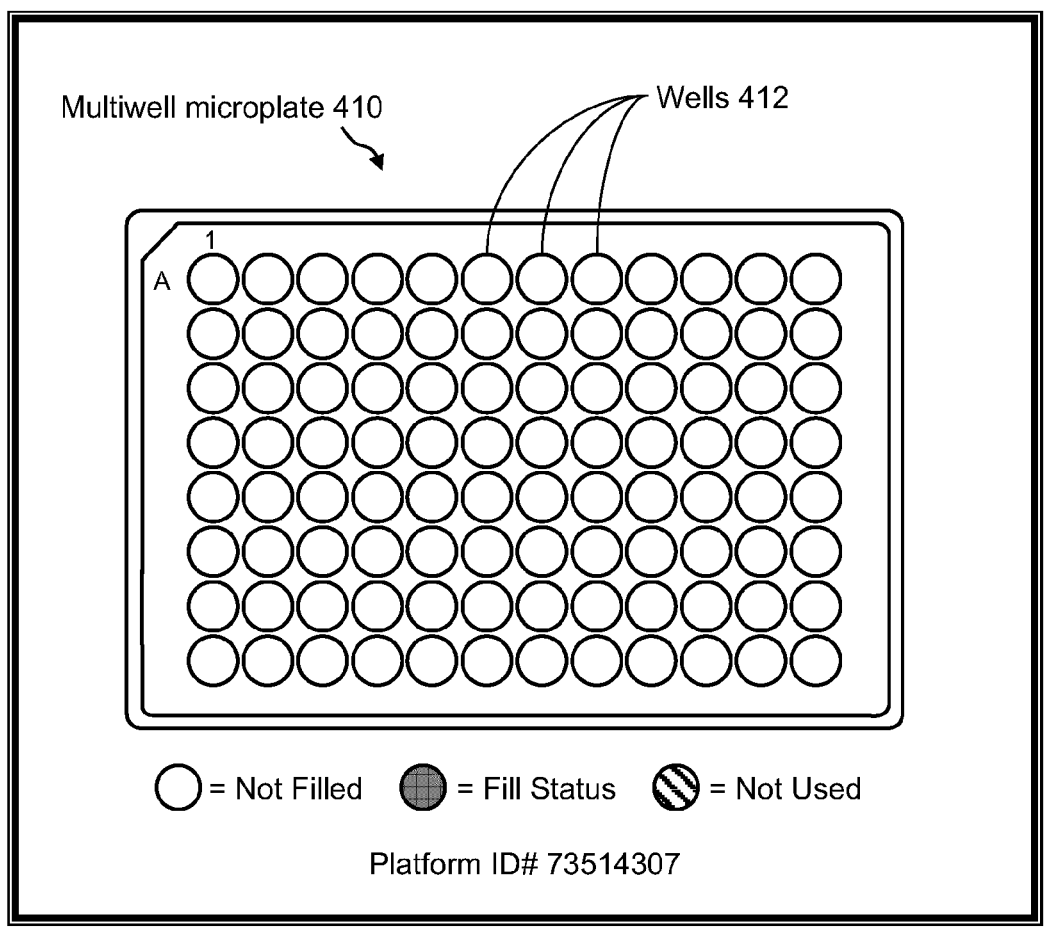
Figure 7B:
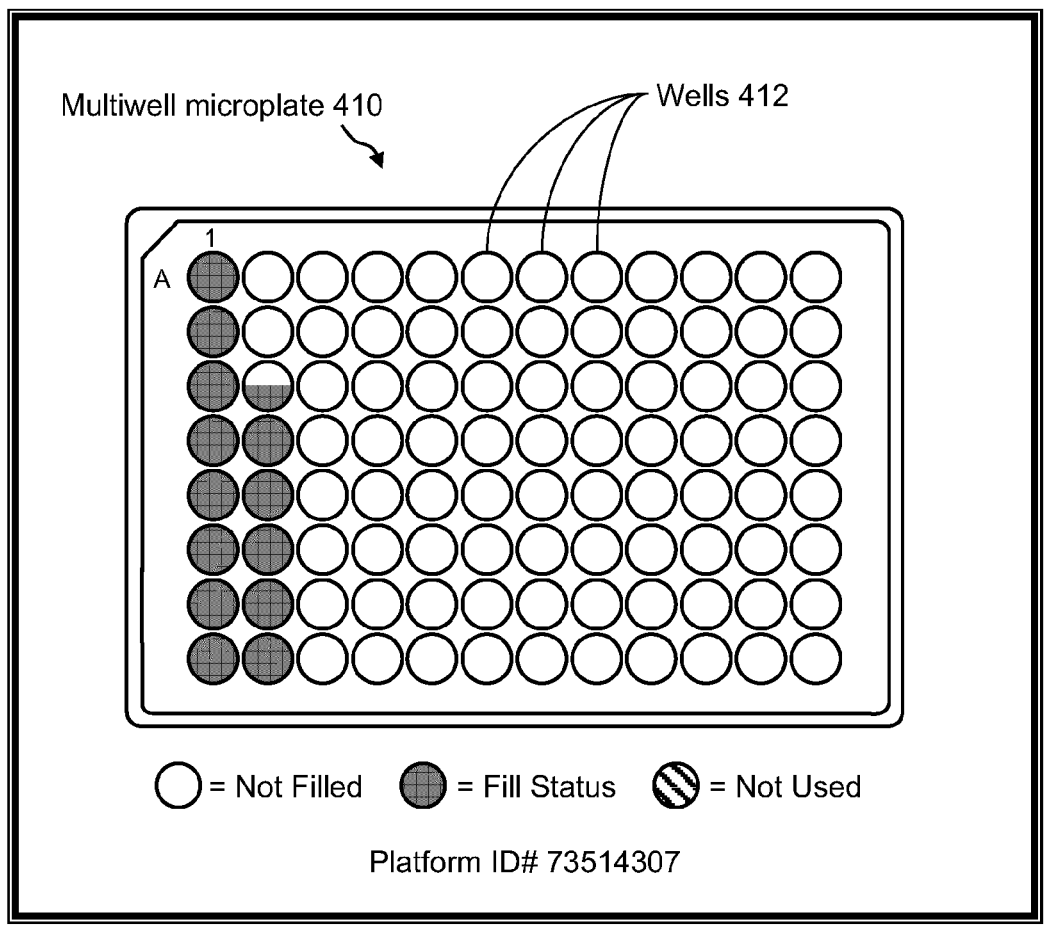
Figure 7C:
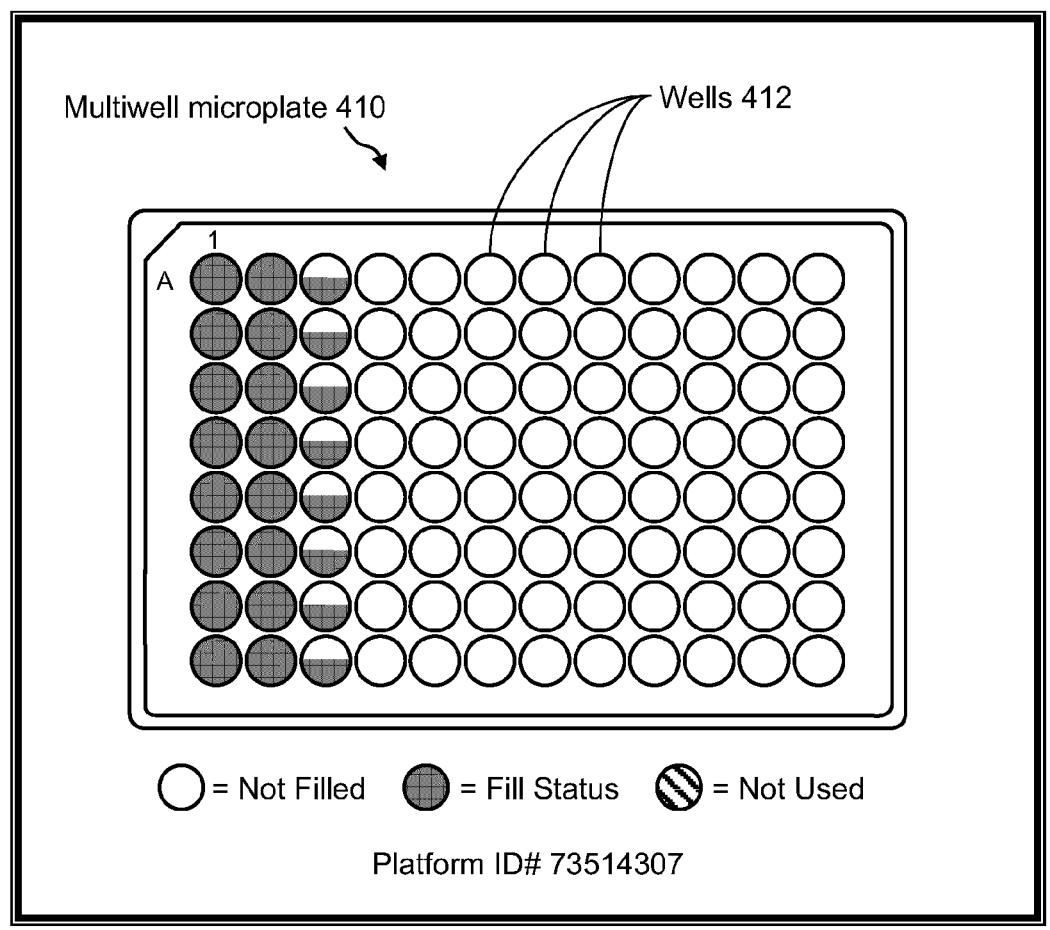

FIG. 7A, FIG. 7B, and FIG. 7C illustrate an example of a user interface panel of the pipette dispenser vision system shown in FIG. 1 showing the filling status of a multiwell microplate in accordance with some embodiments.

Figure 8A:
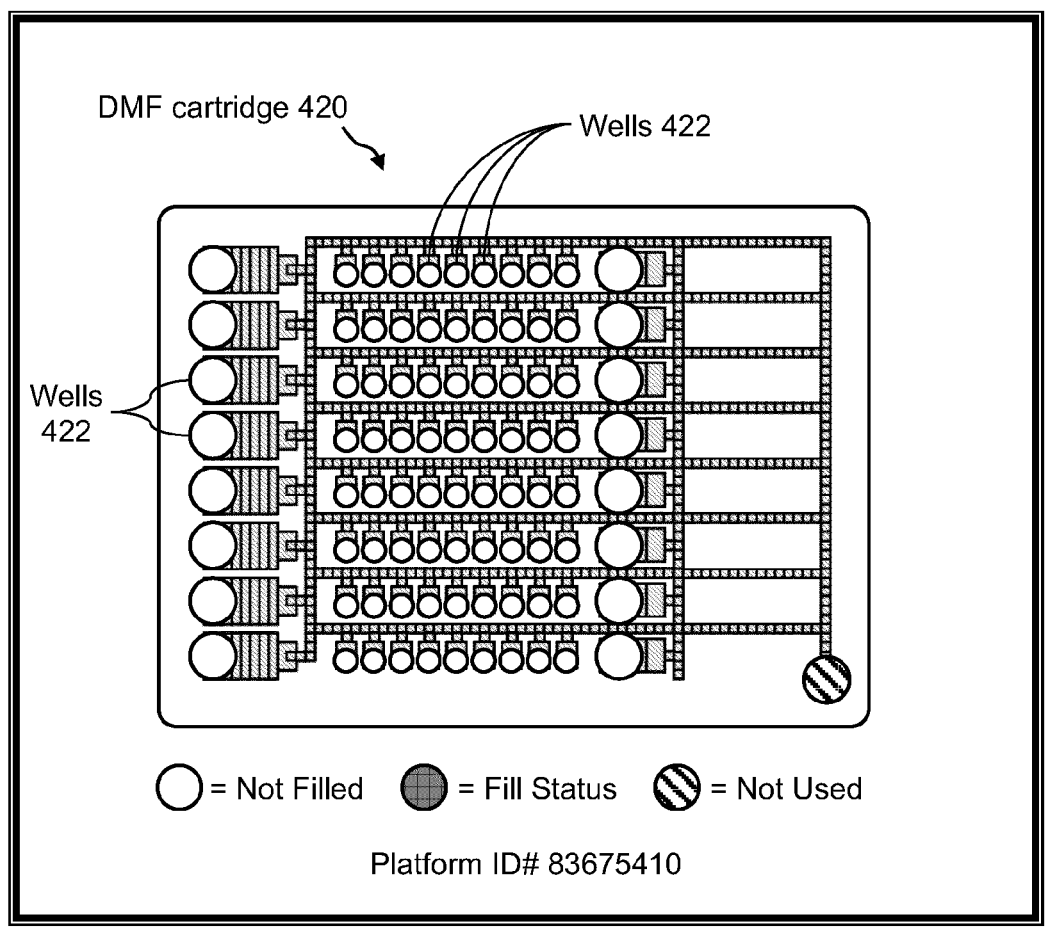
Figure 8B:
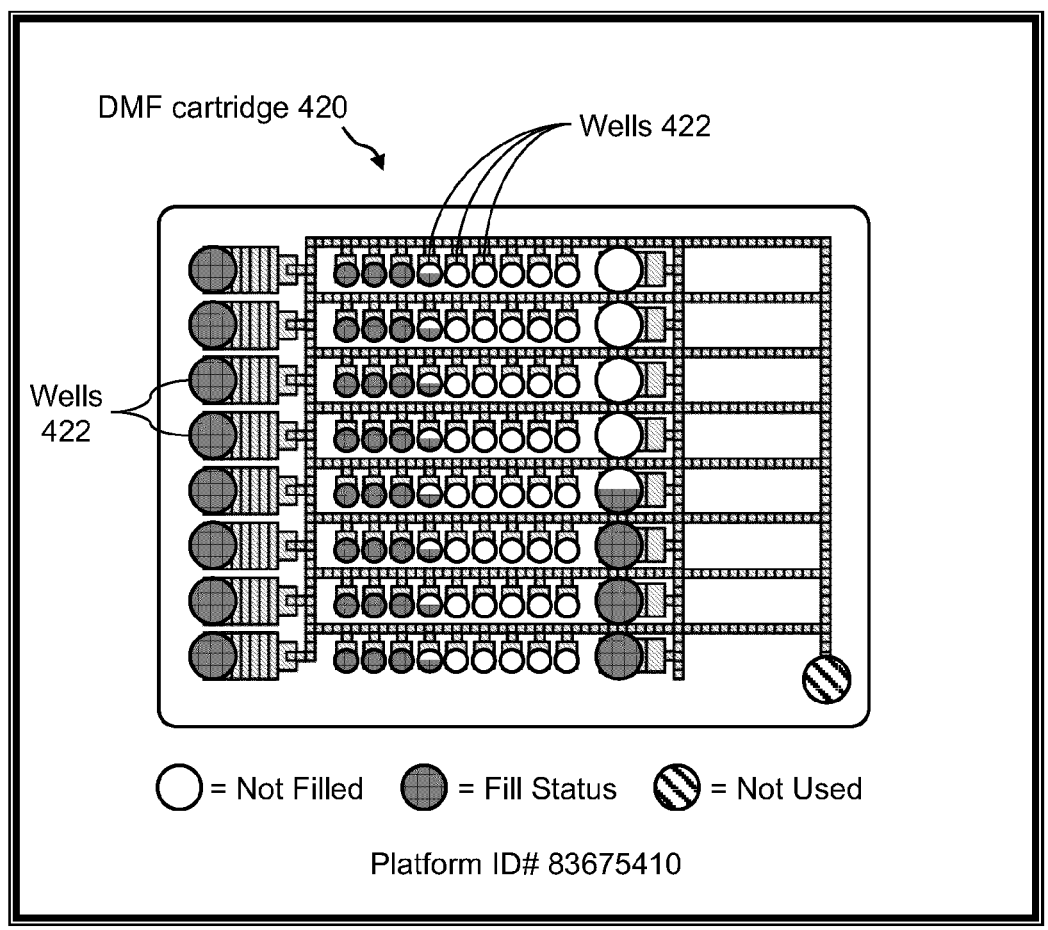

FIG. 8A and FIG. 8B illustrate another example of a user interface panel of the pipette dispenser vision system shown in FIG. 1 showing the filling status of a DMF cartridge in accordance with some embodiments.

Figure 9:
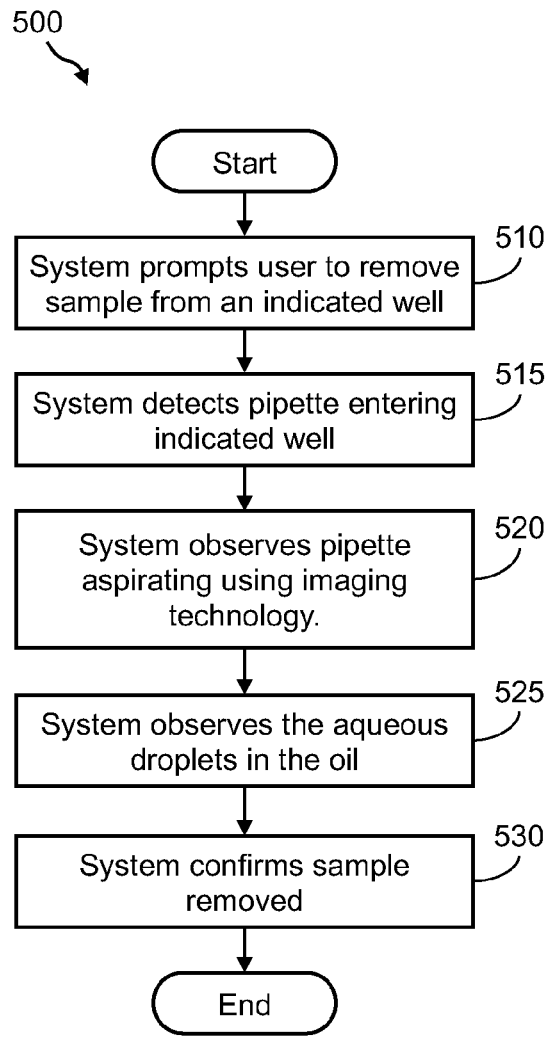

FIG. 9 illustrates a flow diagram of an example of a method of removing liquid from target fluid wells, vessels, and/or reservoirs using the presently disclosed pipette dispenser vision system shown in FIG. 1 in accordance with some embodiments.

6. DETAILED DESCRIPTION OF THE INVENTION

In some embodiments, the presently disclosed subject matter provides a pipette dispenser vision system and method. For example, a pipette dispenser vision system and method are provided for tracking pipettes with respect to dispensing liquid into target fluid wells, vessels, and/or reservoirs. Further, the presently disclosed pipette dispenser vision system and method may be used to support both (1) manual dispensing operations, such as users performing pipetting operations by hand, and (2) automated dispensing operations, such as automated robotic liquid handling systems.

The presently disclosed pipette dispenser vision system may include, for example, a computing device, a red/green/blue (RGB) imaging device, an infrared (IR) imaging device, a time of flight (ToF) imaging device, one or more IR illumination sources, and one or more IR sensors. The IR imaging devices may be integrated onto the same detector as the RGB imaging device (thus forming an RGB+IR imaging device integrated in one module). Multiple RGB and/or IR imaging devices may be used in the system to aid with binocular vision. The computing device may further include a controller with various software modules, data storage, and a user interface. The presently disclosed pipette dispenser vision system may be provided with respect to a single-channel and/or a multi-channel pipette for dispensing liquid into a dispensing platform. The dispensing platform may be, for example, any standard multiwell microplate (e.g., 96-well microplate) and/or a digital microfluidic (DMF) device or cartridge.

Additional sensors may be used to aid the pipette dispenser vision system using, for example, sensor fusion techniques. In one example, remote inertial mass unit-based sensors (e.g., those used in a smart pipettor or a smartwatch on the users' hand) may be used. Other sensors, such as radio frequency (RF) based localization sensors (e.g., radar, RF proximity sensors), may also be used for supplementing the vision.

In some embodiments, a method of using the presently disclosed pipette dispenser vision system is provided and wherein the method may include certain setup steps, such as, but not limited to, user authentication, system calibration, system status checks, sample identification, and a dispensing platform verification. Further, the method may include certain runtime operations, such as, but not limited to, monitoring/verifying the pipetting process, monitoring/verifying the dispensing platform, monitoring/verifying the volume of liquid dispensed, and continuously monitoring system status.

In some embodiments, the presently disclosed pipette dispenser vision system and method may be used to process image data from the RGB imaging device and/or the IR imaging device to monitor/verify certain operations of the pipetting process and/or dispensing platform.

FIG. 1 is a block diagram of an example of the presently disclosed pipette dispenser vision system 100 for tracking pipettes with respect to dispensing liquid into target fluid wells, vessels, and/or reservoirs. Pipette dispenser vision system 100 may be used to support both (1) manual dispensing operations, such as users performing pipetting operations by hand, and (2) automated dispensing operations, such as automated robotic liquid handling systems. Pipette dispenser vision system 100 may include, for example, a computing device 105, a dispensing instrument 107, and communications technology 190 to bidirectionally communicate instructions between the device and instrument (e.g., any wired and/or wireless communications technology).

Computing device 105 may include, for example, a controller 110, a certain amount of data storage 130, and a user interface 148. Dispensing instrument 107 may include, for example, a dispensing portion 150 along with various types, numbers, and/or arrangements of imaging devices 158, illumination sources 160, and/or sensing devices 162 for informing the operation of dispensing portion 150. Optionally, dispensing instrument 107 may include its own local controller 164 and data storage 166.

Dispensing portion 150 of dispensing instrument 107 may include, for example, a dispensing platform 152 and a pipette 154. Further, dispensing platform 152 may include any arrangement of wells (see FIG. 2) that may also include certain dispense indicators 156 (see FIG. 4B and FIG. 4B). The wells of dispensing platform 152 may be any wells, vessels, and/or reservoirs for holding liquid. Dispensing platform 152 may be any platform for receiving liquid via a pipetting process. Pipette 154 may be, for example, a single-channel pipette 154 or a multi-channel pipette 154, as shown, for example, in FIG. 2.

Figure 2:
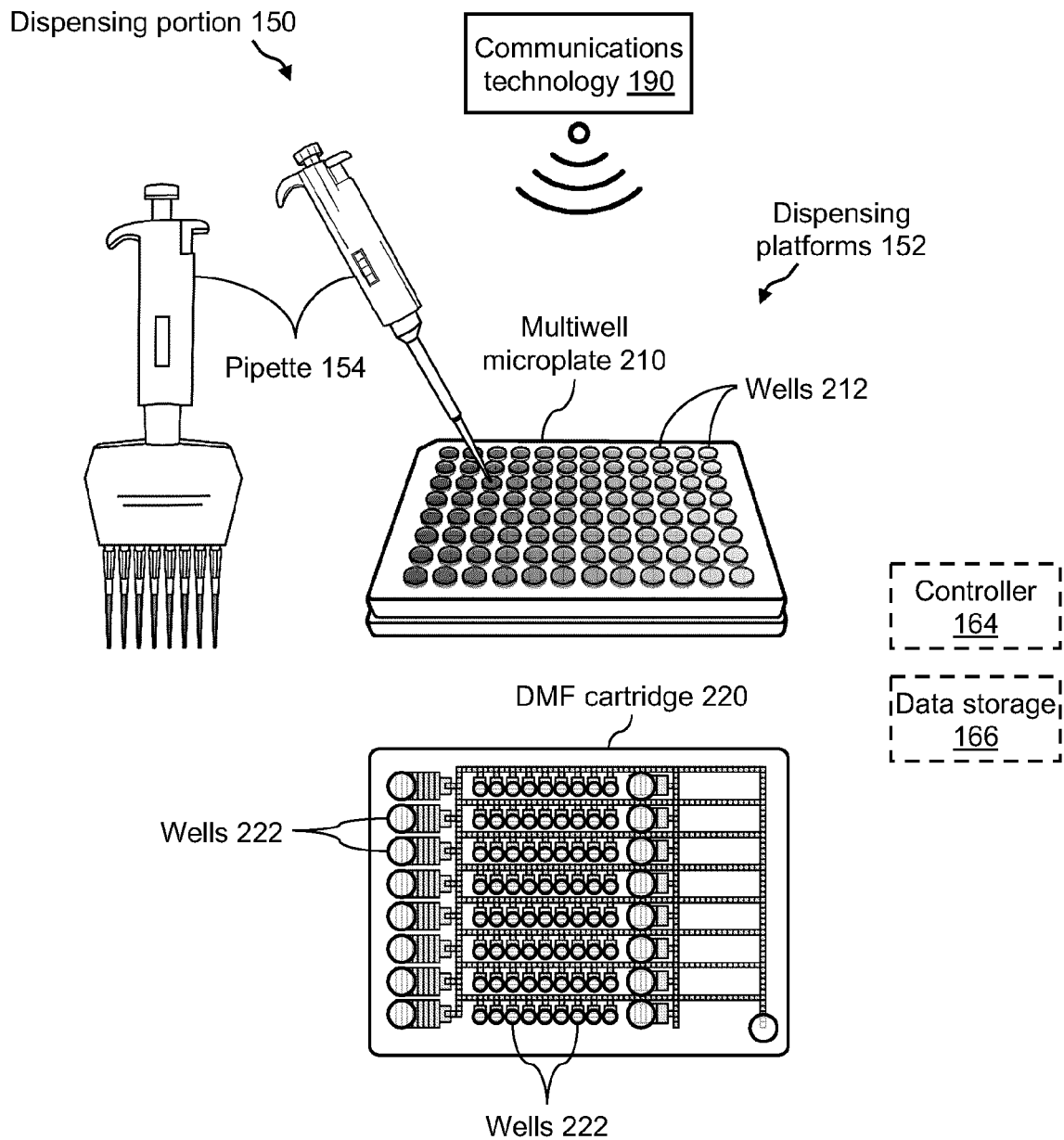
FIG. 2 illustrates a schematic diagram of an example of a dispensing portion of a dispensing instrument of the presently disclosed pipette dispenser vision system shown in FIG. 1 in accordance with some embodiments.

Referring now to FIG. 2 is a schematic diagram of an example of dispensing portion 150 of dispensing instrument 107 of the presently disclosed pipette dispenser vision system 100 shown in FIG. 1.

In one example, FIG. 2 shows that dispensing platform 152 may be a multiwell microplate 210 that includes an arrangement of wells 212 (e.g., fluid wells, vessels, and/or reservoirs). Multiwell microplate 210 may be any standard multiwell microplate. Generally, microplates may be used for a variety of applications, such as, but not limited to, assays, cell culture, sample storage, nucleic acid or protein quantification, sample filtration, and the like. Typically made of plastic or glass, microplates are available in multiple formats, including 1536-well, 384-well, 96-well, 48-well, 24-well, 16-well, 12-well, 8-well, 6-well, 4-well microplates, and strips of wells that fit into plate frames. Different well-volume capacities, well shapes, plate colors, and plate coatings are available for use in the current invention.

In another example, FIG. 2 shows that dispensing platform 152 may be a DMF device or cartridge 220 that includes an arrangement of wells 222 (e.g., fluid wells, vessels, and/or reservoirs). A DMF device may provide digital fluidics capability wherein droplet operations may be used for processing fluids. DMF capabilities generally include transporting, merging, splitting, dispensing, diluting, agitating, and the like. One application of these DMF capabilities is sample preparation. A DMF device or cartridge may include a printed circuit board (PCB) substrate that may include an arrangement of electrowetting electrodes for performing droplet operations. The arrangement of electrowetting electrodes may be supported and/or supplied by the arrangement of wells 222 (i.e., wells, vessels, and/or reservoirs for holding liquid).

FIG. 2 also shows that the wells 212 of multiwell microplate 210 or the wells 222 of DMF device or cartridge 220 may be filled using a single-channel pipette 154 or using a multi-channel pipette 154. Further, the single-channel pipette 154, multi-channel pipette 154, and any dispensing platform 152 may be used in a manual pipetting application and/or robotic pipetting application for dispensing, for example, reagents or sample fluid. The well-volume capacity of wells 212/222 may be, for example, from about a few microliters (L) to about a few milliliters (mL). Further, while computing device 105 may include controller 110 and data storage 130 and while dispensing instrument 107 may optionally include its own local controller 164 and data storage 166; likewise, any dispensing platform 152 may optionally include its own local controller 164 and data storage 166.

Further, wired and/or wireless communications technology 190 may exist throughout pipette dispenser vision system 100. For example, the single-channel pipette 154 or multi-channel pipette 154 may be an electronic or "smart" pipette that includes Bluetooth® technology (along with any other type of useful technology) for communicating with computing device 105. For example, controller 110 of computing device 105 may communicate to the electronic or "smart" pipette 154 a volume to be dispensed. Then, in confirmation, the electronic or "smart" pipette 154 returns the volume of liquid that was dispensed. The electronic or "smart" pipette 154 may be, for example, the electronic pipette available from Andrew Alliance (Milford, MA).

In similar fashion, any type of dispensing platform 152, such as multiwell microplate 210 and DMF device or cartridge 220, may be a "smart" dispensing platform. For example, "smart" dispensing platforms 152 may include wired and/or wireless communications capability, microcontroller capability (e.g., controller 164), data storage (e.g., data storage 166), and the like. For example, ID information, dispensing information, usage information, and the like may be processed and/or stored locally at dispensing platform 152. Further, any dispensing platform 152 (e.g., multiwell microplate 210 and DMF device or cartridge 220) may include near field communication (NFC) tags. For example, the dispense volume and locations can be stored on the NFC tag on the dispensing platform 152 itself, which can be read out.

Figure 3:
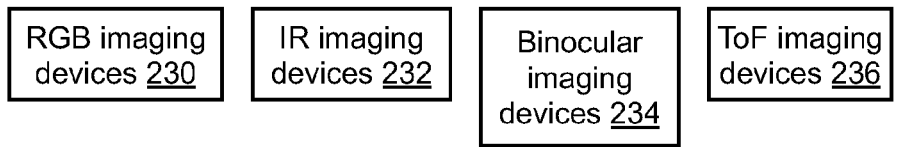
FIG. 3 illustrates a block diagram of examples of imaging devices, illumination sources, and sensing devices of the presently disclosed pipette dispenser vision system shown in FIG. 1 in accordance with some embodiments.
Figure 3:
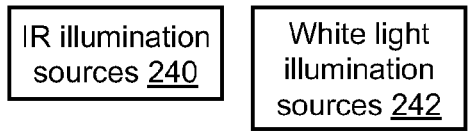
Figure 3:

In dispensing instrument 107, imaging devices 158, illumination sources 160, and/or sensing devices 162 are arranged with respect to dispensing platform 152 and pipette 154 of dispensing portion 150. Referring now to FIG. 3, examples of imaging devices 158 may include, but are not limited to, one or more red/green/blue (RGB) imaging devices 230, one or more infrared (IR) imaging devices 232, one or more binocular imaging devices 234, and one or more ToF imaging devices 236.

An RGB imaging device 230 is a multi-spectral imaging device, such as a digital color camera, that acquires three spectral (red (R), green (G) and blue (B)) images simultaneously; the R channel being 600-700 nm, G channel being 500-600 nm, and B channel being 400-500 nm. In some examples, RGB imaging device 230 may be the digital camera of any mobile device, such as a smartphone, smartwatch, or tablet device.

An IR imaging device 232 (also called infrared camera, thermographic camera, thermal imaging camera, thermal imager, IR imager) is a device that creates an image using infrared radiation (or infrared light). Infrared cameras are sensitive to wavelengths from about 700 nm to about 14 µm. IR imaging device 232 may be a NIR (near infrared, about 700-1000 nm), SWIR (short wave IR, 1000 nm-2.5 µm), thermal/MWIR (mid-wave infrared, 2.5-8 µm) or a LWIR (long wave infrared, 8-14 µm). The choice of infrared imagery may be optimized for a variety of different factors, including but not limited to, size, power, and contrast. The IR imaging device 232 may also include additional filters to enhance the contrast between the imaged subject of interests (e.g., contrast between different liquids).

A binocular imaging device 234 may be, for example, a digital binocular camera. A ToF imaging device 236 may be a ToF camera, which is a range imaging camera system that employs time-of-flight techniques to resolve distance between the camera and the subject for each point of the image, by measuring the round-trip time of an artificial light signal provided by a laser or an LED. Laser-based ToF cameras are part of a broader class of scannerless Light Detection and Ranging (LIDAR) systems.

Referring still to FIG. 3, examples of illumination sources 160 may include, but are not limited to, one or more IR illumination sources 240 and one or more white light illumination sources 242. An IR illumination source 240 is a device that emits light in the infrared spectrum. Infrared light (or infrared radiation) has wavelengths longer than visible light and is usually experienced as heat. IR illumination ranges from about 700 nm to about 1000 nm in the electromagnetic spectrum. IR illumination is what enables cameras to capture images in total darkness. An IR illumination source 240 may also be in the form a laser. This laser may be used for imaging, or may be modulated for use with a ToF sensor. Additionally, an IR illumination source 240 may be in the form of a structured light projector. An IR illumination source 240 may contain optical filters to increase the contrast between the subjects of interest. White light illumination sources 242 may be used to project white light.

Referring still to FIG. 3, examples of sensing devices 162 may include, but are not limited to, one or more IR sensors 250 and one or more RF sensors 252. An IR sensor 250 is an electronic device that measures and detects infrared radiation (or infrared light) in its surrounding environment. For example, IR sensor 250 may be used to detect ambient IR light as well as IR light emitted from the one or more IR illumination sources 240. An RF sensor 252 is an electronic device that measures and detects RF signals in its surrounding environment. Further, sensor fusion may be employed to use two or more different imaging devices 158, illumination sources 160, and/or sensing devices 162 to improve the estimation algorithms in pipette dispenser vision system 100.

Referring now again to FIG. 1, computing device 105 and/or controller 110 may be used to manage imaging devices 158, illumination sources 160, sensing devices 162, any local controllers 164, and any local data storage 166 of dispensing instrument 107 with respect to tracking pipettes (e.g., pipette 154) for dispensing liquid into wells of dispensing platform 152. Computing device 105 may be any computing device capable of processing program instructions and capable of connecting to a network. For example, computing device 105 may be a desktop computer, a laptop computer, a tablet device, a mobile phone or smartphone, a smartwatch, an application server, a cloud computing device in a cloud computing environment, and the like.

Controller 110 may be any standard controller, processor, and/or microprocessor device capable of executing program instructions. Data storage 130 may be any volatile or non-volatile memory device. Data storage 130 may be built into or separate from controller 110. Certain software may be installed and running on controller 110, such as, but not limited to, control software 112, calibration software 114, image processing software 116, authentication software 118, and voice control software 120. Controller 110 itself may also be a virtual machine, with actual processing taking place across multiple physical processors. In some embodiments, a cloud services provider may allocate certain processing resources to create a virtual Controller 110. A virtual Controller 110 may be connected to other elements of Pipette dispenser vision system 100, such as Data storage 130 and Illumination sources 160 for example, via an internet connection that may be distinct from Communications technology 190.

In some embodiments, Data storage 130 may be a physical storage device, or a virtual storage device with one logical drive spread across multiple physical storage devices. Further, virtualization or other cloud computing technologies may be utilized. In addition, different computers (physical or virtual) or mobile devices may be used to control different aspects of the system, such as one computer for illumination sources 160, another computer for managing image devices 158, and a mobile device for sensing devices 162.

User interface 148 may be, for example, a graphical user interface (GUI) for displaying any information utilized, acquired, and/or generated by pipette dispenser vision system 100 (see FIG. 7A through FIG. 8B). For example, any information stored in data storage 130 may be processed and displayed to a user via user interface 148. Examples of information stored in data storage 130 may include, but are not limited to, platform data 132, a lookup table 134, calibration data 136, image data 138, sample data 140, dispense data 142 that may include well locations, and user data 144. Additionally, a user may interface with pipette dispenser vision system 100 using voice control software 120 in the form of audio-based commands through a speaker and microphone. In some embodiments, User interface 148 may be a GUI on a mobile device for displaying any of the above information. The mobile device's speakers and microphones may be used by voice control software 120 to receive voice input commands, and output audio results to a user.

In one example, platform data 132 may include dispense locations as part of the metadata of, for example, multiwell microplate 210 and DMF device or cartridge 220. Further, dispense data 142 may include the dispense volume and locations can be stored on the NFC tag on the cartridge itself and read out.

Referring still to FIG. 1, pipette dispenser vision system 100 may be used to track one or more pipettes 154 with respect to dispensing liquid into the target wells of dispensing platform 152. For example, controller 110 (with control software 112 and image processing software 116) uses information from imaging devices 158, illumination sources 160, and sensing devices 162 to track the one or more pipettes 154 and determine into which wells liquid is dispensed.

Additionally, other features are provided in pipette dispenser vision system 100 for assisting the pipette dispensing operations thereof. For example, FIG. 4A and FIG. 4B show examples of dispense indicators 156 that may be detected and/or processed using imaging devices 158, illumination sources 160, and/or sensing devices 162.

Figure 4A:
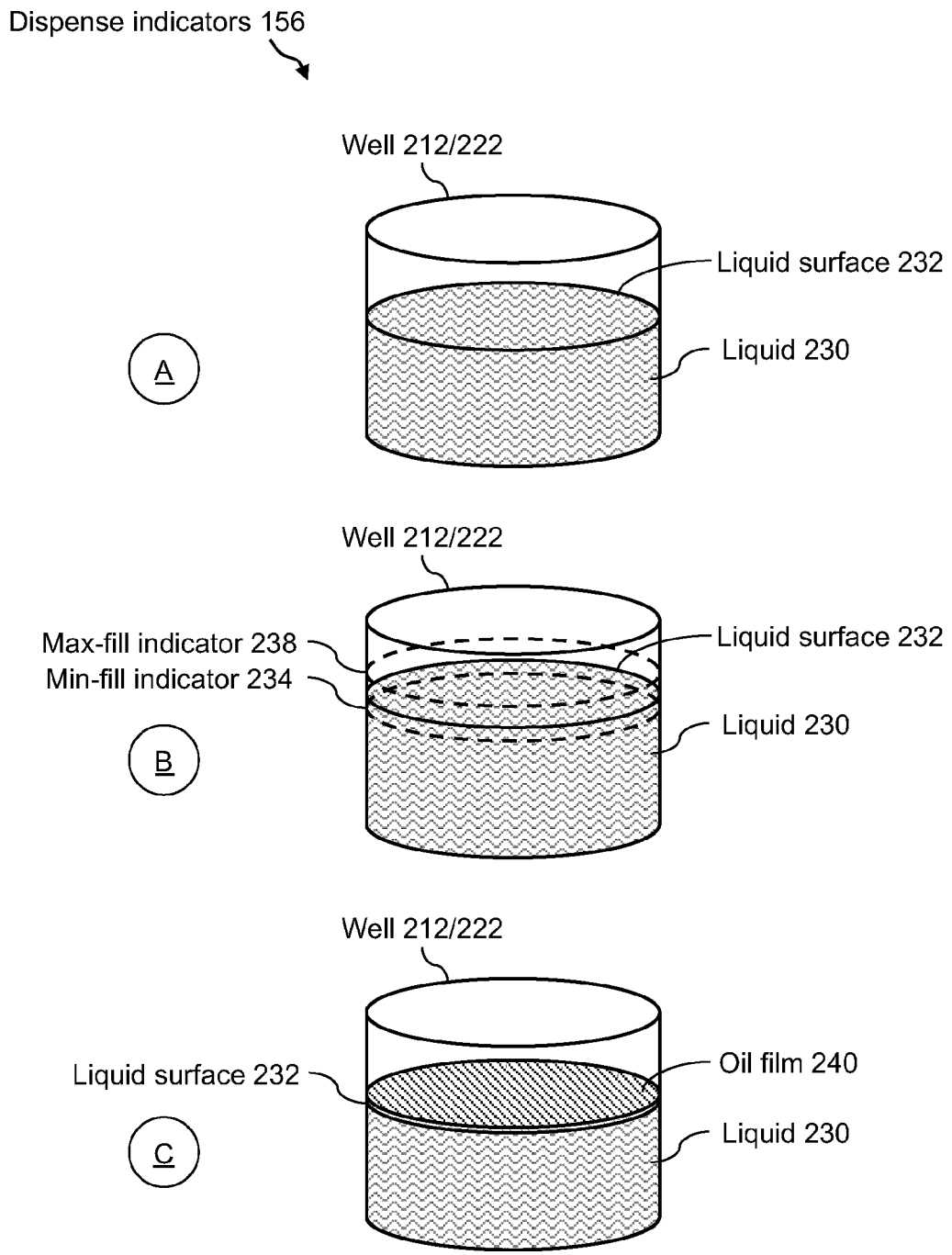
FIG. 4A and FIG. 4B illustrate examples of dispensing indicators of the presently disclosed pipette dispenser vision system shown in FIG. 1 in accordance with some embodiments.
Figure 4B:
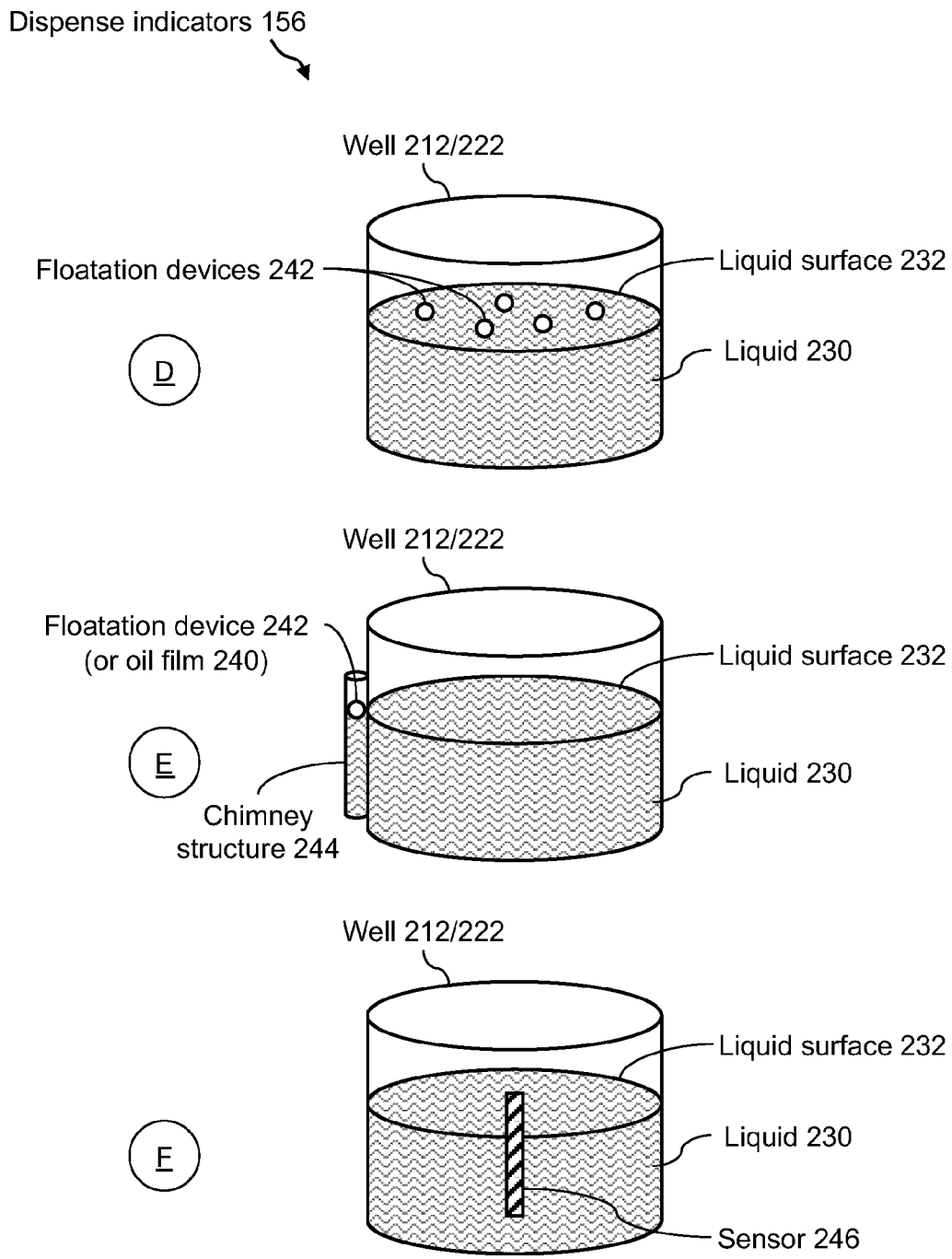

In an example A of FIG. 4A, a well 212/222 is holding a certain volume of liquid 230 that has a liquid surface 232. In this example, the level of the liquid surface 232 may be detected using imaging devices 158, illumination sources 160, and sensing devices 162 to inform, detect, and/or confirm the volume of liquid 230 dispensed into well 212/222. Accordingly, the liquid surface 232 itself may be an example of dispense indicators 156.

In an example B of FIG. 4A, a min-fill indicator 234 and a max fill indicator 238 may be marked around the walls of well 212/222. In this example, the level of the liquid surface 232 in relation to min-fill indicator 234 and/or max-fill indicator 238 may be detected using imaging devices 158, illumination sources 160, and sensing devices 162 to inform, detect, and/or confirm the volume of liquid 230 dispensed into well 212/222. Accordingly, min-fill indicator 234 and/or max-fill indicator 238 may be another example of dispense indicators 156.

In an example C of FIG. 4A, a certain amount of oil may be provided in well 212/222 such that an oil film 240 may be floating atop liquid surface 232 of liquid 230 in well 212/222. The level of oil film 240 in well 212/222 may be detected using imaging devices 158, illumination sources 160, and sensing devices 162 to inform, detect, and/or confirm the volume of liquid 230 dispensed into well 212/222. Oil film 240 may be, for example, silicone oil. Further, a dye may be added to oil film 240 to aid detection thereof. For example, the dye may be a fluorescent dye. Illumination may be, for example, fluorescent, infrared, visible, or any combination of the foregoing. Accordingly, oil film 240 floating atop liquid 230 may be yet another example of dispense indicators 156. In this example, ultrasonic or laser reflections may be used to detect oil film 240 and assess the volume of liquid 230 in well 212/222. These techniques may be used to differentiate oil film 240 from aqueous droplets or solutions.

In an example D of FIG. 4B, one or more floatation devices 242 may be provided in well 212/222. Floatation devices 242 may be plastic beads, balls, or any small objects designed to float atop liquid 230 in well 212/222. The level of floatation devices 242 in well 212/222 may be detected using imaging devices 158, illumination sources 160, and sensing devices 162 to inform, detect, and/or confirm the volume of liquid 230 dispensed into well 212/222. Accordingly, the one or more floatation devices 242 floating atop liquid 230 may be yet another example of dispense indicators 156.

In an example E of FIG. 4B, a chimney structure 244 may be provided on the side of and fluidly-coupled to well 212/222 such that liquid 230 is in chimney structure 244. Further, at least one floatation device 242 is floating atop liquid 230 in chimney structure 244. In another example, instead of floatation device 242, oil film 240 can be floating atop liquid 230 in chimney structure 244. The level of floatation device 242 (or oil film 240) in chimney structure 244 may be detected using imaging devices 158, illumination sources 160, and sensing devices 162 to inform, detect, and/or confirm the volume of liquid 230 dispensed into well 212/222. Accordingly, floatation device 242 in chimney structure 244 may be yet another example of dispense indicators 156.

In an example F of FIG. 4B, a sensor 246 may be provided along the wall of well 212/222. Sensor 246 provides feedback as to the level of liquid 230 in well 212/222. Sensor 246 may be, for example, materials that would indicate the presence or absence of water, e.g., frosted glass or frosted plastic. One example implementation is the use of texture in the well. This texture would randomly refract light at the well/air interface thus giving it a white appearance. However, when this interface has water in it, the difference in the refractive index is lowered, thus leading to reduced scattering (and thus changing appearance to clear). Accordingly, sensor 246 may be still another example of dispense indicators 156. In this example, real-time feedback from sensor 246 in well 212/222 may tell the user when the fill level has been reached.

In another example, well 212/222 may include any combinations of the dispense indicators 156 shown in examples A, B, C, D, E, and F of FIG. 4A and FIG. 4B.

Figure 5:
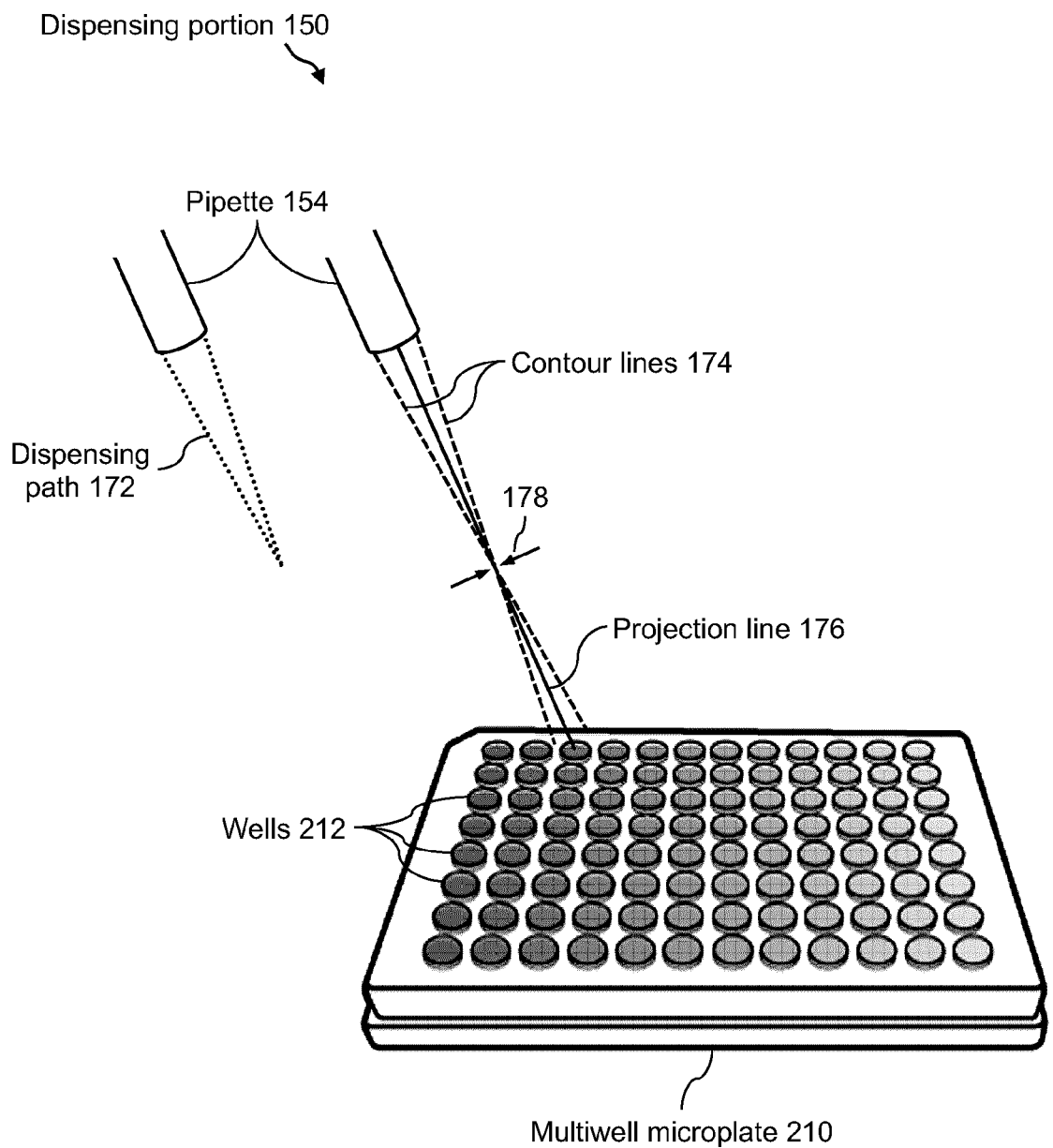
FIG. 5 illustrates a schematic diagram showing more details of the dispensing portion of the presently disclosed pipette dispenser vision system shown in FIG. 1 in accordance with some embodiments.

Referring now to FIG. 5 is a schematic diagram of the dispensing portion of a dispensing instrument of the pipette dispenser vision system 100 shown in FIG. 1. FIG. 5 shows certain characteristics of each pipette 154. For example, each pipette 154 has a certain dispensing path 172 that may be characteristic of the shape of its tip. For example, the tip of each pipette 154 has a certain curvature, which is indicated by contour lines 174, and a straight-line dispensing path, which is indicated by a projection line 176. The intersection of the contour lines 174 and projection line 176 may be called the geometric intersection point 178. Due to the pipette tip curvature, the geometric intersection point 178 may be ahead or in front of the actual pipette tip.

Referring now to FIG. 1 and FIG. 5, pipette dispenser vision system 100 includes one or more imaging devices 158, one or more illumination sources 160, and one or more sensing devices 162. The field of view (FOV) of, for example, RGB imaging device 230 and/or IR imaging device 232 allows images to be captured that are used for several features of pipette dispenser vision system 100. For example, both RGB imaging device 230 and IR imaging device 232 may be used for detection. IR sensor 250 may be used, along with the one or more IR illumination sources 240 to improve image capture in low lighting conditions or when the light in the visible range reflects off the dispensing platform 152 being processed.

The operation of pipette dispenser vision system 100 may include certain setup steps. The setup steps may include, but are not limited to, a user authentication step, a calibration step, a system status check step, a sample identification step, and a dispensing platform verification step. Further, the operation of pipette dispenser vision system 100 may include certain runtime operations. The runtime operations may include, but are not limited to, monitoring/verifying the pipetting process, monitoring/verifying the dispensing platform, monitoring/verifying the volume of liquid dispensed, and continuously monitoring system status. More details of an example of performing these setup and/or runtime operations are described hereinbelow with reference to FIG. 6.

Figure 6:
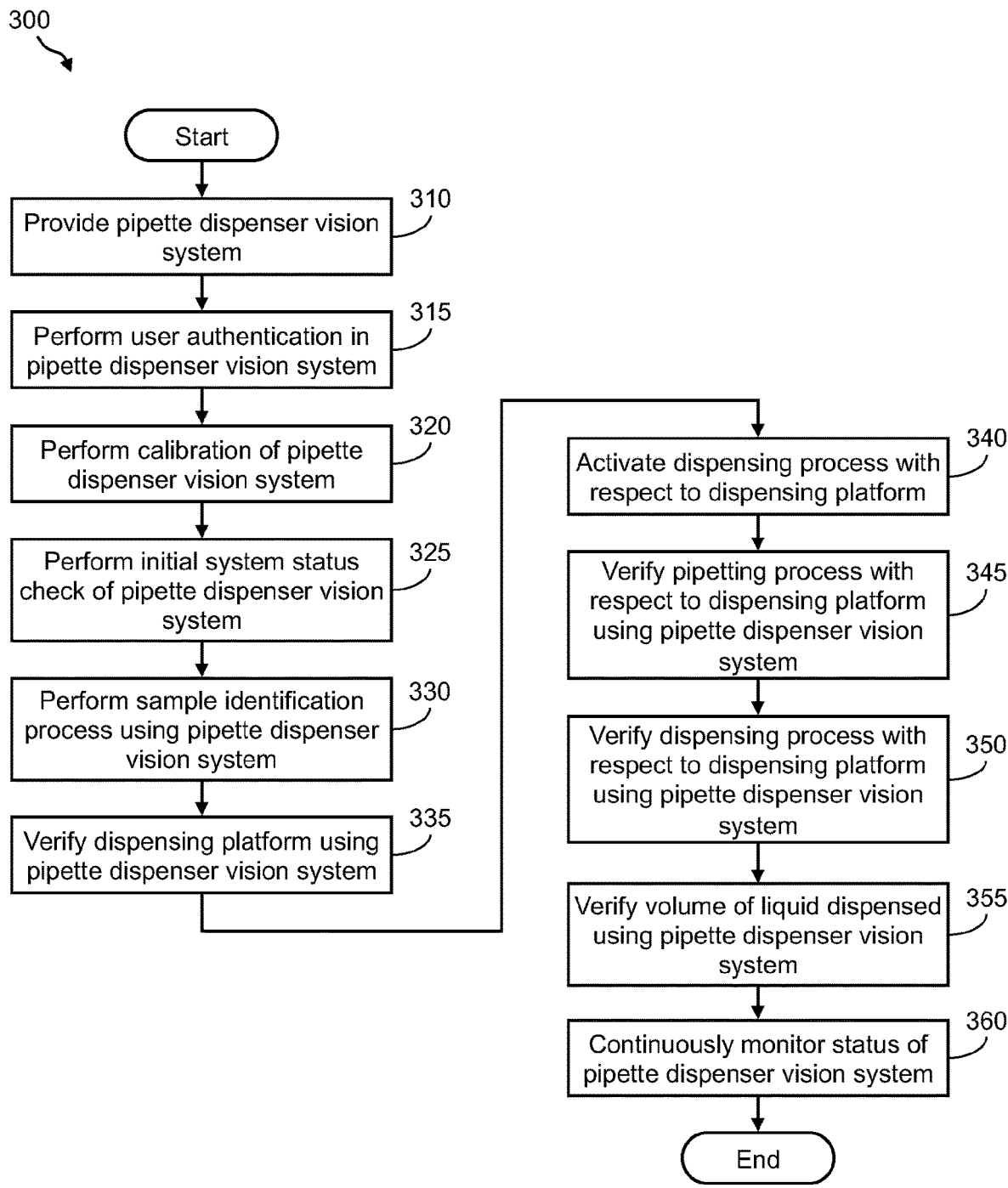
FIG. 6 illustrates a flow diagram of an embodiment of a method of using the presently disclosed pipette dispenser vision system shown in FIG. 1 for tracking pipettes with respect to dispensing liquid into target fluid wells, vessels, and/or reservoirs in accordance with some embodiments.

Referring now to FIG. 6 is a flow diagram of an embodiment of a method 300 of using the presently disclosed pipette dispenser vision system 100 shown in FIG. 1 for tracking pipettes with respect to dispensing liquid into target fluid wells, vessels, and/or reservoirs. Further, pipette dispenser vision system 100 and method 300 may be used to support both (1) manual dispensing operations, such as users performing pipetting operations by hand, and (2) automated dispensing operations, such as automated robotic liquid handling systems.

Throughout the steps of method 300, a log of any current errors as well as a log of prior errors made for each user may be stored in user data 144 in data storage 130, which may serve as a reminder to each respective user. Additionally, a record of frequently occurring errors across multiple users may be maintained in data storage 130, also as reminders to users. Further, voice control may be utilized (e.g., via voice control software 120) for directing operations in any steps of method 300. Further, in method 300, information may flow to and/or from any dispensing platform 152 and/or any pipette 154. For example, information may flow to dispensing platform 152 and/or pipette 154 from any portion of computing device 105 and/or dispensing instrument 107. Likewise, information may flow from dispensing platform 152 and/or pipette 154 to any portion of computing device 105 and/or dispensing instrument 107. Method 300 may include, but is not limited to, the following steps, which may be performed in any order.

At a step 310, the presently disclosed pipette dispenser vision system 100 is provided. For example, pipette dispenser vision system 100 shown and described with reference to FIG. 1 through FIG. 5 may be provided.

At a step 315, a user authentication process is performed with respect to pipette dispenser vision system 100. For example, as users register, part of the registration process may be to setup standard login credentials (e.g., user ID, password) and/or to authenticate using facial recognition. Accordingly, authentication software 118 of computing device 105 may be used to verify users authorized to use pipette dispenser vision system 100. In one example, authentication software 118 may be used to recognize unique facial features to authenticate and login the user. In this example, RGB imaging device 230 may be used to capture an image of the user's face and then authentication software 118 uses biometric facial recognition to authenticate users. Additionally, authentication software 118 may utilize any combination of one or more processes, such as facial recognition; fingerprint-based authentication; voice recognition; time-based tokens; passwords, pins, or patterns; and the like.

At a step 320, a calibration process of pipette dispenser vision system 100 is performed. For example, at startup, calibration software 114 is used to perform a one-time initial calibrated setup to manually map/mark the well-positions in 3D projection. As a certain pipette 154 enters the FOV of RGB imaging device 230 and/or IR imaging device 232, image processing operations of control software 112 and/or image processing software 116 may be used to identify the pipette edges, as indicated, for example, by contour lines 174 shown in FIG. 5. These edges (i.e., contour lines 174) are further extended to find geometric intersection point 178, as shown in FIG. 5. Due to the pipette tip curvature, geometric intersection point 178 may be ahead or in front of the actual tip.

Continuing step 320, the offset between geometric intersection point 178 and the pipette tip may be estimated using the calibration process of calibration software 114. Additionally, if multiple sensors are used (e.g., binocular imaging, remote sensors, ToF sensors, or RF sensors), the signals from all of the sensors may be fused in order to improve the accuracy of the aforementioned calibration. Lookup table 134 is generated during this calibration process. Lookup table 134 contains the pre-calculated offset values for each well-position. For example, each time geometric intersection point 178 approaches a well, the corresponding offset value will be read from lookup table 134 to get the actual pipette tip position. The edges (i.e., contour lines 174) of pipette 154 are also used to calculate the centerline of the pipette 154, such as, for example, projection line 176 shown in FIG. 5. The centerline (i.e., projection line 176) is projected toward dispensing platform 152 to estimate the probable well that the pipette 154 is targeting. As the pipette 154 gets closer to the well, the probability of the target well increases. As the pipette tip enters a well, control software 112 and/or image processing software 116 confirms the probability that the targeted well is above an acceptable threshold and maps the well location, which may be, for example, dispense data 142.

Continuing step 320, the respective well is indicated on the display screen as "filled" and the process continues with the next pipette 154 to enter the FOV of RGB imaging device 230 and/or IR imaging device 232. In one example, FIG. 7A, FIG. 7B, and FIG. 7C show an example of a well display screen 400 of user interface 148 of pipette dispenser vision system 100 shown in FIG. 1. In this example, a multiwell microplate 410 with wells 412 represents an example of a multiwell microplate dispensing platform 152, which is the target of the dispensing process. FIG. 7A depicts all wells 412 of multiwell microplate 410 not filled (or empty). FIG. 7B depicts some wells 412 of multiwell microplate 410 filled, one well 412 partially filled, and the remaining wells 412 not filled (or empty). FIG. 7B may be showing the calibration of a single-channel pipette 154 as it travels from one well 412 to the next. FIG. 7C depicts some columns of wells 412 of multiwell microplate 410 filled, one column of wells 412 partially filled, and the remaining columns of wells 412 not filled (or empty). FIG. 7C may be showing the calibration of a multi-channel pipette 154 as it travels from one columns of wells 412 to the next.

Continuing step 320, well display screen 400 of user interface 148 may include a control feature (not shown) that can be used to project light (via one of the illumination sources 160) directly onto the areas of interest being loaded on the target dispensing platform 152. That is, a certain well of interest may be illuminated by one of the illumination sources 160 to help guide the user with loading the dispensing platform 152.

In another example, FIG. 8A and FIG. 8B show well display screen 400 displaying a DMF cartridge 420 with wells 422. DMF cartridge 420 represents an example of a DMF cartridge dispensing platform 152, which is the target of the dispensing process. FIG. 8A depicts all wells 422 of DMF cartridge 420 not filled (or empty). FIG. 8B depicts some wells 412 of DMF cartridge 420 filled, one well 422 partially filled, and the remaining wells 422 not filled (or empty). FIG. 8B may be showing the calibration of a single-channel pipette 154 as it travels from one well 422 to the next.

While well display screen 400 has been described above with respect to the calibration process, well display screen 400 or a similar display screen may be provided to depict the real-time dispensing process during runtime. For example, visual feedback (e.g., projection via a display screen similar to well display screen 400) as well as audio feedback (e.g., via speakers) may be used to guide the user.

Referring again to FIG. 6, at a step 325, an initial system status check is performed of the dispensing platform using pipette dispenser vision system 100. For example, the readiness of certain physical and/or operating conditions of the dispensing system is verified using pipette dispenser vision system 100. For example, prior to starting, the status of certain sensors (e.g., doors sensors, cover sensors, latch sensors, dispensing platform sensors, power sensors, etc.) may be verified. Any error conditions may be flagged to the user for taking remedy.

At a step 330, a sample identification process is performed using pipette dispenser vision system 100. For example, as samples are loaded into pipette dispenser vision system 100, RGB imaging device 230 and/or IR imaging device 232 may be used to capture, for example, barcodes or QR codes attached to the sample tubes and/or attached to dispensing platform 152 (e.g., platform data 132). This information (e.g., sample data 140) along with the dispense location information (e.g., dispense data 142) of step 320, allows control software 112 and/or image processing software 116 to map and keep track of each sample that is identified using the information contained in the barcode or QR code. Once the data is identified, control software 112 and/or image processing software 116 may be used to map and track the sample data to the results obtained by pipette dispenser vision system 100.

At a step 335, a dispensing platform is verified using pipette dispenser vision system 100. For example, pipette dispenser vision system 100 may be used to confirm the proper setup of dispensing platform 152, such as confirming the proper setup of a certain DMF cartridge dispensing platform 152. In this example, pipette dispenser vision system 100 may be used to confirm that the cartridge filler fluid was inserted in the cartridge, and that the cap was opened prior to transferring or pipetting the filler fluid into the DMF cartridge dispensing platform 152. Further, any of the dispense indicators 156 described in FIG. 4A and FIG. 4B may be used during this verification step.

At a step 340, a dispensing process with respect to the dispensing platform is activated. For example, a dispensing process using a single-channel pipette 154 or using a multi-channel pipette 154 is activated with respect to dispensing platform 152 and wherein dispensing platform 152 may be, for example, multiwell microplate 210 (see FIG. 2) or DMF cartridge 220 (see FIG. 2).

At a step 345, a pipetting process with respect to dispensing platform 152 is verified using pipette dispenser vision system 100. For example, pipette dispenser vision system 100 may be used to track each of the pipettes 154 and determine into which well of dispensing platform 152 each of the pipettes 154 dispenses liquid. For example, pipette dispenser vision system 100 identifies and tracks a pipette 154 as it enters the FOV of RGB imaging device 230 and/or IR imaging device 232. Control software 112 and/or image processing software 116 of computing device 105 leverages the known shape of a pipette 154 and a known layout of the dispensing platform 152 (e.g., a certain DMF device or cartridge) of interest. With respect to RGB imaging device 230 and/or IR imaging device 232, a 1920×1080 pixel resolution frame may be sufficient to ensure the non-linear mapping of the wells with enough margin between wells in 3D projection. For example, any of the dispense indicators 156 described in FIG. 4A and FIG. 4B may be used during this verification step.

At a step 350, a dispensing process with respect to dispensing platform 152 is verified using pipette dispenser vision system 100. For example, as each well is filled, control software 112 and/or image processing software 116 processes information (e.g., image data 138) from RGB imaging device 230 and/or IR imaging device 232 in real time, and monitors the change in contrast of, for example, the pipette tip filled with liquid (prior to dispensing) vs. a substantially transparent pipette tip (absent any liquid, following dispensing). By monitoring the change in contrast, control software 112 and/or image processing software 116 may confirm that the fluid has been dispensed from the certain pipette 154. For example, any of the dispense indicators 156 described in FIG. 4A and FIG. 4B may be used during this verification step.

At a step 355, the volume of liquid dispensed is verified using pipette dispenser vision system 100. For example, using control software 112 and/or image processing software 116, the level of fluid in the pipette tip may be monitored before and after the tip is placed in the well. Further, control software 112 and/or image processing software 116 may be used to determine the actual volume of fluid that was pipetted into each well and can thereby confirm whether the intended prescribed volume was added. A display screen of user interface 148 may be provided similar to well display screen 400 of FIG. 7A, FIG. 7B, and FIG. 7C and FIG. 8A and FIG. 8B to indicate the volume dispensed at each well.

Continuing step 355, in another example, the one or more imaging devices 158 may be used to zoom into the specific well and recreate the image on a display screen of user interface 148. In this way, the user may visualize a magnified view of the well and its fill-level.

At a step 360, during run time, the status of the general operating conditions of pipette dispenser vision system 100 are continuously monitored. In one example, control software 112 of computing device 105 may be used to monitor, for example, the status of doors, covers, latches, dispensing platform 152-placement, and so on, to ensure user safety and/or process integrity. In another example, control software 112 and/or image processing software 116 of computing device 105 may be used to monitor any movement of pipette dispenser vision system 100. This may be done, for example, by control software 112 and/or image processing software 116 referencing stationary objects in the environment (i.e., in the FOV of RGB imaging device 230 and/or IR imaging device 232). Then, this information may be used to determine whether pipette dispenser vision system 100 is moving or tilting, which may adversely affect the test results. In yet another example, control software 112 and/or image processing software 116 of computing device 105 may be used to monitor robotic loading of dispensing platforms 152 and/or robotic pipetting of liquid samples. This may serve as an additional quality/feedback mechanism of pipette dispenser vision system 100.

Referring now to FIG. 9 is a flow diagram of an example of a method 500 of removing liquid from target fluid wells, vessels, and/or reservoirs using the presently disclosed pipette dispenser vision system 100 shown in FIG. 1. As one example, the system may perform this operation as part of the monitoring phase as described in step 360 of FIG. 6. The removal of liquid may be required if, for example, a fluid well, vessel, and/or reservoir was inadvertently filled, if the amount of liquid filled was incorrect, if the fill indicator (e.g., oil) was incorrect, or other monitored changes in the general operating conditions of the system. As described in example C of FIG. 4A, in some embodiments, the pipette dispenser system may utilize oil floating atop a liquid surface. The vision system of the present invention overcomes the risk that only the oil will be removed (thus, leaving the remaining liquid and potentially introducing further complications to the dispensing system) by imaging and analyzing after the pipette has removed the sample from the well.

At a step 510, using, for example, computing device 105, the user is prompted to remove the sample from an indicated well. The prompt may be provided in response to control software 112 and/or image processing software 116 determining an actual volume of fluid that was pipetted into a well (or wells) did not meet an intended prescribed volume. An indication to the user as to the well (or wells) with the dispensing issue may be provided to the user via user interface 148, for example. The user may be required to confirm the removal operation before the vision system executes corrective action, or in other embodiments the indication may be merely a notification and the vision system takes automatic action.

At a step 515, using, for example, imaging devices 158, dispenser vision system 100 detects the pipette entering the indicated well from which the system will remove the sample. Pipette dispenser vision system 100 may be used to identify and track the pipette as it enters the FOV of RGB imaging device 230 and/or IR imaging device 232.

At a step 520, using, for example, imaging devices 158, dispenser vision system 100 observes the pipette aspirating. The pipette may be placed below the liquid surface in the center of the well so as to extract the entire sample. However, in embodiments in which oil may be floating atop the liquid surface, aspirating may introduce the problem of water-in-oil droplets in the pipette; that is, while the sample and oil may be separated in the well, these fluids become mixed upon aspiration.

At a step 525, using, for example, imaging devices 158, dispenser vision system 100 determines whether there are aqueous droplets in the oil. In one embodiment, by imaging the sample using both RGB and IR imaging (e.g., RGB imaging device 230 and IR imaging device 232), the vision system amplifies the contrast between water and oil and increases the accuracy with which the system can confirm that the entire sample was extracted from the well. In other embodiments, the system may add a dye to the sample to further enhance contrast, meaning that one type of imaging device only may be required to provide the determination. For example, the dye may be a fluorescent dye.

At a step 530, using, for example, imaging devices 158, dispenser vision system 100 confirms that the sample is removed. This information may be provided to the user in response to image processing software 116 processing analysis from both RGB and IR imaging sources via user interface 148, for example. The user may be required to manually confirm the removal operation is satisfactory, or in other embodiments the indication may be merely a notification.

However, if based on the analysis in step 525, dispenser vision system 100 observes only oil, then dispenser vision system 100 may prompt the user to retry aspiration (return to step 510). The user may be required to confirm the operation before the vision system executes a retry, or in other embodiments, the indication may be merely a notification to the user and the vision system takes further automatic corrective action if the vision system deems removal non-satisfactory.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter. For example, the term "about," when referring to a value may be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications may be practiced within the scope of the appended claims.

We claim:

1. A pipette dispenser vision system, the system comprising:
 (a) a dispensing platform comprising a plurality of wells, wherein the plurality of wells comprise dispense indicators;
 (b) one or more pipettes for conducting a pipetting process comprising dispensing liquid to the plurality of wells of the dispensing platform;
 (c) an imaging device for imaging the dispensing platform during the pipetting process to generate image data, wherein the imaging device is configured to image the dispense indicators to generate the image data; and (d) one or more controllers coupled to the one or more pipettes and to the imaging device and configured to:
   (i) receive the image data; and
   (ii) based on the image data, verifying the pipetting process, wherein verifying the pipetting process uses the dispense indicators to confirm a fluid volume in the plurality of wells.

2. The system of claim 1, wherein the one or more controllers are further configured to, based on the image data, cause one or more pipettes to modify the pipetting process.

3. The system of claim 1, wherein the one or more pipettes are robotically controlled.

4. The system of claim 1, further comprising a second imaging device arranged for imaging the dispensing platform during the pipetting process to generate second image data.

5. The system of claim 4, wherein the imaging device comprises an RGB imaging device and the second imaging device comprises an IR imaging device.

6. The system of claim 1, further comprising a user interface electronically coupled to the one or more controllers and configured to indicate a fill status of one or more wells of the dispensing platform.

7. The system of claim 1, wherein at least one dispense indicator is an oil film.

8. The system of claim 1, wherein the dispensing platform is a 1536-well, 384-well, 96-well, 48-well, 24-well, 16-well, 12-well, 8-well, 6-well, or 4-well plate.

9. The system of claim 1, wherein the dispensing platform is a microfluidic cartridge.

10. The system of claim 1, wherein the dispensing platform is a digital microfluidic (DMF) cartridge.

11. The system of claim 1, wherein the dispensing platform comprises a barcode or QR code.

12. The system of claim 11, wherein the imaging device is configured to capture the barcode or QR code to generate a platform data comprising sample data and dispense data.

13. The system of claim 1, wherein the system comprises one or more sensors.

14. The system of claim 13, wherein the one or more sensors are one or more remote inertial mass unit-based sensors, one or more radio frequency (RF) based localization sensors, or a combination thereof.

15. The system of claim 13, wherein the one or more sensors is configured to provide supplemental data to aid the pipetting process.

16. The system of claim 1, wherein the one or more pipettes are one or more single-channel pipettes or multi-channel pipettes.

17. The systems of claim 1, wherein at least one dispense indicator is a surface of the liquid.

18. The system of claim 1, wherein at least one dispense indicator is a marking on a surface of a well of the plurality of wells.

* * * * *